(12) United States Patent
Naka et al.

(10) Patent No.: US 11,459,763 B2
(45) Date of Patent: Oct. 4, 2022

(54) BLOWER

(71) Applicant: MAKITA CORPORATION, Anjo (JP)

(72) Inventors: Shinsuke Naka, Anjo (JP); Ryoji Zama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 683 days.

(21) Appl. No.: 16/283,054

(22) Filed: Feb. 22, 2019

(65) Prior Publication Data
US 2019/0301164 A1 Oct. 3, 2019

(30) Foreign Application Priority Data
Mar. 30, 2018 (JP) .............................. JP2018-067296

(51) Int. Cl.
*E04D 13/076* (2006.01)
*F04D 25/06* (2006.01)

(52) U.S. Cl.
CPC .......... *E04D 13/0765* (2013.01); *F04D 25/06* (2013.01)

(58) Field of Classification Search
CPC ............................ E04D 13/0765; F04D 25/06
USPC .......................................................... 15/405
See application file for complete search history.

(56) References Cited

U.S. PATENT DOCUMENTS

| 2,623,234 | A | * | 12/1952 | Brown | E04D 13/0765 |
| | | | | | 15/352 |
| 3,109,083 | A | * | 10/1963 | Meltzer | B44D 3/168 |
| | | | | | 15/327.5 |
| 3,143,984 | A | * | 8/1964 | Morasch | A01G 20/30 |
| | | | | | 172/371 |
| 3,908,910 | A | * | 9/1975 | Detwiler | B08B 3/02 |
| | | | | | 239/587.5 |
| 4,121,320 | A | * | 10/1978 | Feiner | E04D 13/0765 |
| | | | | | 15/406 |
| 4,132,507 | A | * | 1/1979 | Akiyama | B05B 1/005 |
| | | | | | 417/364 |
| 4,150,793 | A | * | 4/1979 | Russo | E04D 13/0765 |
| | | | | | 239/66 |
| 4,269,571 | A | * | 5/1981 | Shikutani | A47L 5/14 |
| | | | | | D23/383 |
| 4,304,498 | A | * | 12/1981 | George | E04D 13/0765 |
| | | | | | 52/16 |

(Continued)

FOREIGN PATENT DOCUMENTS

| JP | 6-76515 U | 10/1994 |
| JP | 8-193396 A | 7/1996 |
| JP | 2015-102062 A | 6/2015 |

OTHER PUBLICATIONS

Notice of Reasons for Refusal dated Jan. 18, 2022 from the Japanese Patent Office in Japanese Application No. 2018-067296.

*Primary Examiner* — Logan M Kraft
*Assistant Examiner* — John D Bailey
(74) *Attorney, Agent, or Firm* — Sughrue Mion, PLLC

(57) ABSTRACT

A blower reduces debris blown toward an operator when air is jetted from a distal end of a blower pipe. A blower includes a blower body and a blower pipe. The blower body includes an impeller drivable to rotate by a prime mover, and a casing accommodating the impeller. The casing includes an air inlet and an air outlet. The blower pipe includes a basal end coupled to the air outlet, a distal end from which air ejected through the air outlet is jetted, and a peripheral wall having one or more openings.

19 Claims, 8 Drawing Sheets

(56) References Cited

U.S. PATENT DOCUMENTS

| | | | | |
|---|---|---|---|---|
| 4,363,335 | A * | 12/1982 | Tapper | E04D 13/0765 15/406 |
| 4,402,106 | A * | 9/1983 | Mattson | E04D 13/0765 15/406 |
| 4,644,606 | A * | 2/1987 | Luerken | A47L 5/14 15/330 |
| 4,723,893 | A * | 2/1988 | Kiyooka | A47L 5/14 417/364 |
| 4,750,883 | A * | 6/1988 | Drake | A47L 13/03 401/289 |
| 4,884,314 | A * | 12/1989 | Miner | A01G 20/47 15/419 |
| 4,945,604 | A * | 8/1990 | Miner | A47L 9/2884 15/410 |
| 5,022,586 | A * | 6/1991 | Putnam | B05B 15/68 134/167 C |
| 5,035,586 | A * | 7/1991 | Sadler | E01H 1/0809 417/364 |
| 5,054,159 | A * | 10/1991 | Richardson | A47L 5/14 15/393 |
| 5,056,187 | A * | 10/1991 | Higgins | A47L 9/02 D32/31 |
| 5,361,452 | A * | 11/1994 | Horn | B08B 5/02 15/406 |
| 5,386,942 | A * | 2/1995 | Dietle | B05B 15/656 239/565 |
| 5,573,187 | A * | 11/1996 | Proctor | B08B 9/093 134/167 C |
| 5,586,360 | A * | 12/1996 | Diederiks, Jr. | E04D 13/0765 15/410 |
| 5,649,370 | A * | 7/1997 | Russo | A45D 20/12 34/97 |
| 5,652,995 | A * | 8/1997 | Henke | A47L 9/08 15/415.1 |
| 5,661,910 | A * | 9/1997 | Schepisi | A45D 20/12 34/96 |
| 5,813,088 | A * | 9/1998 | Wagner | F16M 13/04 15/327.5 |
| 5,950,276 | A * | 9/1999 | Everts | A01G 20/47 15/418 |
| 6,076,231 | A * | 6/2000 | Bucher | A47L 9/02 15/415.1 |
| 6,105,206 | A * | 8/2000 | Tokumaru | F04D 19/002 15/410 |
| 6,257,256 | B1 * | 7/2001 | Fischer | B08B 3/026 134/167 C |
| 6,519,809 | B2 * | 2/2003 | Gutry | A47L 9/02 15/327.5 |
| 6,766,560 | B2 * | 7/2004 | Murphy | A47L 9/327 15/344 |
| 6,843,516 | B2 * | 1/2005 | Bishop | F16L 21/06 277/645 |
| 7,559,490 | B2 * | 7/2009 | Rappin | B05B 7/2475 239/289 |
| 7,717,104 | B2 * | 5/2010 | Looft | B67B 7/16 392/379 |
| 7,814,615 | B1 * | 10/2010 | Ries | A47L 5/14 15/327.5 |
| 7,946,812 | B2 * | 5/2011 | Lambolez | G01M 17/0074 415/213.1 |
| 8,407,913 | B2 * | 4/2013 | Langley | A45D 19/16 606/41 |
| 8,739,362 | B1 * | 6/2014 | Conder | B08B 5/02 15/406 |
| 8,918,956 | B2 * | 12/2014 | Pellenc | E01H 1/0809 15/344 |
| 8,919,672 | B2 * | 12/2014 | Chen | B05B 15/68 239/587.5 |
| 9,015,901 | B2 * | 4/2015 | Namekata | A01G 20/47 15/345 |
| 9,149,104 | B2 * | 10/2015 | Yoe | A45D 20/124 |
| 9,347,223 | B1 * | 5/2016 | Ashton-Miller | B08B 5/02 |
| 9,883,634 | B2 * | 2/2018 | Romito | A01G 20/47 |
| 10,567,709 | B1 * | 2/2020 | Motill | H04N 5/2252 |
| D877,436 | S * | 3/2020 | Ashton-Miller | D32/45 |
| 2002/0108207 | A1 * | 8/2002 | Oohama | A47L 5/14 15/330 |
| 2002/0157210 | A1 * | 10/2002 | Minor | A47L 9/02 15/345 |
| 2004/0143931 | A1 * | 7/2004 | Dennis | A47L 5/14 15/405 |
| 2006/0185114 | A1 * | 8/2006 | Joos | F04D 27/008 15/330 |
| 2006/0289036 | A1 * | 12/2006 | Hilton | E04D 13/0765 134/22.12 |
| 2008/0163450 | A1 * | 7/2008 | Disanto | A01G 20/47 15/405 |
| 2008/0189904 | A1 * | 8/2008 | Schliemann | F04D 19/007 417/234 |
| 2011/0179598 | A1 * | 7/2011 | Esteban | E04D 13/0765 15/415.1 |
| 2013/0133682 | A1 * | 5/2013 | Yoe | A45D 20/124 132/227 |
| 2014/0230181 | A1 * | 8/2014 | Yamaoka | A01G 20/47 15/344 |
| 2016/0123330 | A1 * | 5/2016 | Thompson | F04D 25/06 417/423.1 |
| 2016/0157686 | A1 * | 6/2016 | Bermudez | A01G 20/47 15/330 |
| 2016/0201945 | A1 * | 7/2016 | Han | F24H 3/0423 392/385 |
| 2017/0021489 | A1 * | 1/2017 | Bylund | F04D 19/002 |
| 2017/0231163 | A1 * | 8/2017 | Nolin | A01G 20/47 15/405 |
| 2017/0260985 | A1 * | 9/2017 | Gao | F04D 25/084 |
| 2018/0163750 | A1 * | 6/2018 | Landén | F04D 25/08 |
| 2018/0274545 | A1 * | 9/2018 | Ragg | F04D 17/16 |

* cited by examiner

BLOWER

CROSS-REFERENCE TO RELATED APPLICATIONS

This application claims the benefit of priority to Japanese Patent Application No. 2018-067296, filed on Mar. 30, 2018, the entire contents of which are hereby incorporated by reference.

BACKGROUND

1. Technical Field

The present invention relates to a blower.

2. Description of the Background

Japanese Unexamined Utility Model Registration Application Publication No. 6-76515 (hereafter, Patent Literature 1) and Japanese Unexamined Patent Application Publication No. 8-193396 (hereafter, Patent Literature 2) describe blowers for cleaning rain gutters, such as eaves gutters. A known blower includes a blower body having a handle held by an operator, and a blower pipe having a basal end coupled to an air outlet port of the blower body. Air ejected through the air outlet port of the blower body is jetted from the distal end of the blower pipe. During cleaning of a rain gutter, an operator places a straight pipe of the blower pipe vertically, while holding the handle of the blower body with the distal end of the blower pipe facing the rain gutter substantially right above the operator.

BRIEF SUMMARY

Leaves, dust, or other matter accumulating in the rain gutter blown with air jetted from the distal end of the blower pipe may fall on the operator holding the handle of the blower body substantially right below the rain gutter.

One or more aspects of the present invention are directed to reducing debris blown toward an operator when air is jetted from a distal end of a blower pipe of a blower.

An aspect of the present invention provides a blower, including:

a blower body including
  an impeller drivable to rotate by a prime mover, and
  a casing accommodating the impeller, and including an air inlet and an air outlet; and
a blower pipe including
  a basal end coupled to the air outlet,
  a distal end from which air ejected through the air outlet is jetted, and
  a peripheral wall having one or more openings.

A blower according to the aspects of the present invention reduces debris blown toward an operator when air is jetted from a distal end of a blower pipe of a blower.

DETAILED DESCRIPTION

Embodiments of the present invention will now be described below with reference to the drawings.

Figure 1:
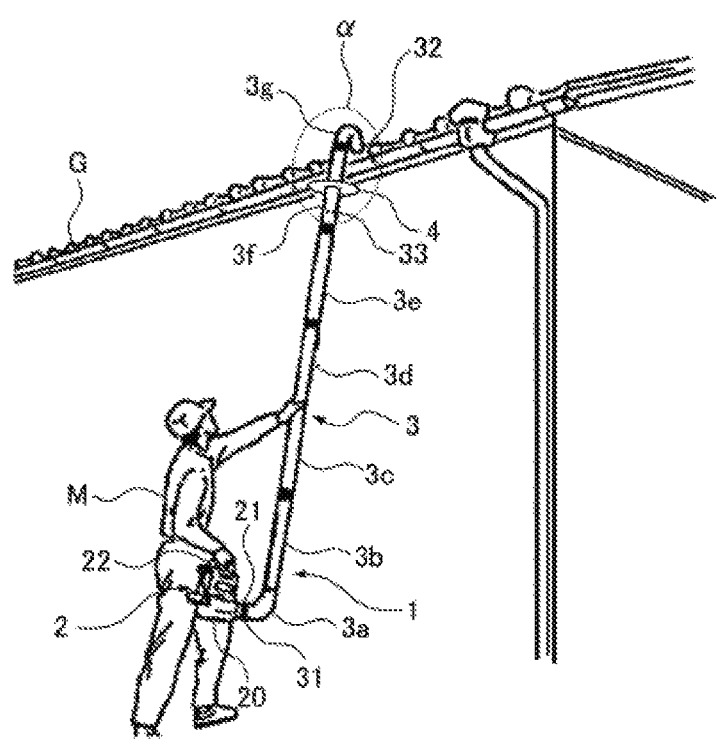
FIG. 1 is a diagram of a blower according to a first embodiment used for cleaning a rain gutter.
Figure 2:
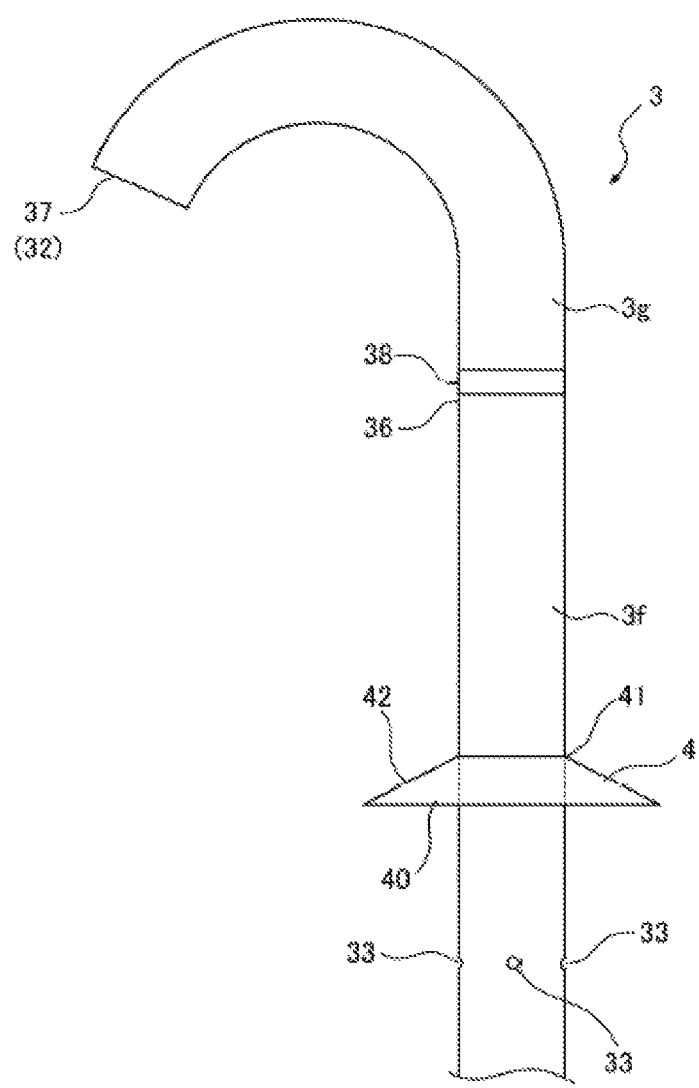
FIG. 2 is a partially enlarged side view of a blower pipe according to the first embodiment.

FIG. 1 is a diagram of a blower 1 according to a first embodiment used for cleaning a rain gutter (e.g., an eaves gutter) G. FIG. 2 is a partially enlarged side view of a blower pipe 3 according to the present embodiment. FIG. 2 shows area a in FIG. 1.

The blower 1 according to the present embodiment is a hand-held blower. The blower 1 includes a blower body 2 and a blower pipe 3. The blower body 2 includes a prime mover (not shown), an impeller (not shown), and a casing 20. The impeller is driven to rotate by a prime mover. The prime mover is an electric motor (motor) in the present embodiment, but is not limited to an electric motor. To feed power to the electric motor, the blower body 2 may include a battery and/or a power line for connection to an external power source.

The casing 20 accommodates the impeller. The casing 20 includes an air inlet (not shown), an air outlet 21, and a handle 22 to be held by an operator M. The blower body 2 takes in air through the air inlet as the impeller rotates and ejects the air through the air outlet 21.

The blower pipe 3 is formed from, for example, a resin. The blower pipe 3 has, for example, a circular or oval cross section, but may have a cross section with another shape. The blower pipe 3 is removably attached to the air outlet 21 of the blower body 2. The blower pipe 3 has a distal end 32, which is a first open end, and a basal end 31, which is a second open end. The basal end 31 is coupled to the air outlet 21. Air ejected through the air outlet 21 flows into the blower pipe 3 from the basal end 31, flows through the blower pipe 3, and is jetted from the distal end 32.

The blower pipe 3 includes an elbow 3a, straight pipes 3b, 3c, 3d, 3e, and 3f, and a curved pipe (end nozzle) 3g. The elbow 3a is coupled to the air outlet 21. The straight pipe 3b is coupled to the distal end of the elbow 3a. The straight pipe 3c is coupled to the distal end of the straight pipe 3b. The straight pipe 3d is coupled to the distal end of the straight pipe 3c. The straight pipe 3e is coupled to the distal end of the straight pipe 3d. The straight pipe 3f is coupled to the distal end of the straight pipe 3e. The curved pipe 3g is coupled to a distal end 36 of the straight pipe 3f. The blower pipe 3 according to the present embodiment includes the five straight pipes 3b to 3f, but may include any number of straight pipes. The blower pipe 3 may include straight pipes (e.g., straight pipes 3b to 3f) and the curved pipe 3g without the elbow 3a. In this example, a straight pipe (e.g., the straight pipe 3b) is coupled to the air outlet 21.

In the present embodiment, the open end of the elbow 3a coupled to the air outlet 21 is defined as the basal end 31. The elbow 3a is bent in an L-shape.

The straight pipes 3b to 3f each have a straight axis. The straight pipes 3b to 3f each have a distal end as an upper end, and a basal end as a lower end. In other words, the straight pipes 3b to 3f are placed vertically.

In the present embodiment, a first end 37 of the curved pipe 3g is defined as the distal end 32 of the blower pipe 3. A second end 38 of the curved pipe 3g is coupled to the distal end 36 of the straight pipe 3f. The curved pipe 3g has a curved axis. The curved pipe 3g is curved in, for example, a C-shape, a U-shape, or a J-shape. The curved pipe 3g may be flexible and deformable. The first end 37 of the curved pipe 3g may be tapered.

A plurality of (four in the present embodiment) openings 33 are located in the peripheral wall of the straight pipe 3f. More specifically, the blower 1 has the openings 33 in the straight pipe 3f. The openings 33 allow passage into and out of the blower pipe 3. The blower pipe 3 according to the present embodiment has four openings 33 in the peripheral wall of the straight pipe 3f, but may have any number of openings 33.

The openings 33 according to the present embodiment are circumferentially spaced from one another in the straight pipe 3f. The openings 33 may be circumferentially spaced at regular intervals in the straight pipe 3f. In the present embodiment, the openings 33 are at intervals of 90 degrees about the axis of the straight pipe 3f.

Each opening 33 has an opening area S1, which is smaller than an opening area S2 of the first end 37 of the curved pipe 3g. The opening area S1 may constitute 1.5 to 10% of the opening area S2, or may specifically constitute 6 to 9% of the opening area S2.

A total opening area S3 of all the openings 33 may constitute 6 to 45% of the opening area S2, or may specifically constitute 20 to 35% of the opening area S2.

In the present embodiment, some air flowing through the straight pipe 3f is radially jetted out of the straight pipe 3f through the openings 33. The air is jetted through the openings 33 in the direction substantially perpendicular to the direction of air flowing through the straight pipe 3f.

In the present embodiment, the straight pipe 3f has a guard 4 attached to its outer circumferential surface. The guard 4 includes a truncated conical body 40. The body 40 has a through-hole 41 and a slope 42. The through-hole 41 is at the center of the body 40, and can receive the straight pipe 3f. The slope 42 is a side surface flared downward from the straight pipe 3f. The guard 4 protrudes radially outward from the outer circumferential surface of the straight pipe 3f.

In the present embodiment, the openings 33 are located nearer the basal end of the straight pipe 3f (nearer the basal end 31 of the blower pipe 3) than the guard 4. More specifically, the openings 33 are located below the guard 4.

Figure 3:
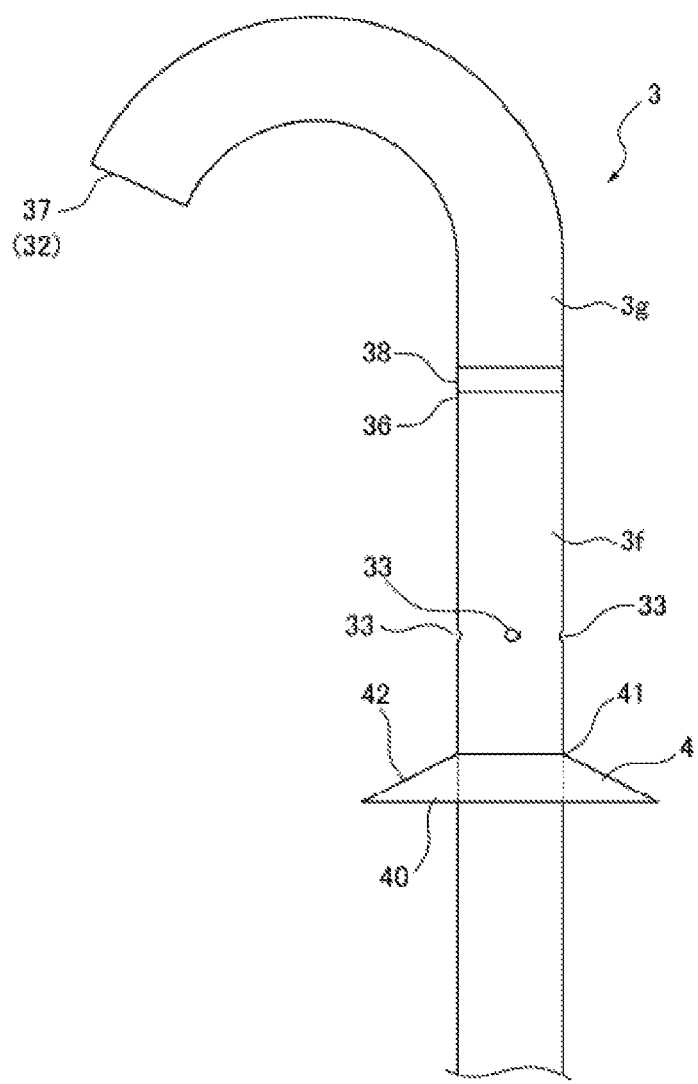
FIG. 3 is a partially enlarged side view of a blower pipe according to a first modification.

FIG. 3 is a partially enlarged side view of a blower pipe 3 according to a first modification. The blower pipe 3 will be described focusing on its differences from the first embodiment described with reference to FIG. 2.

In the present modification, the openings 33 are located nearer the distal end 36 of the straight pipe 3f (nearer the distal end 32 of the blower pipe 3) than the guard 4. More specifically, the openings 33 are located above the guard 4.

Figure 4:
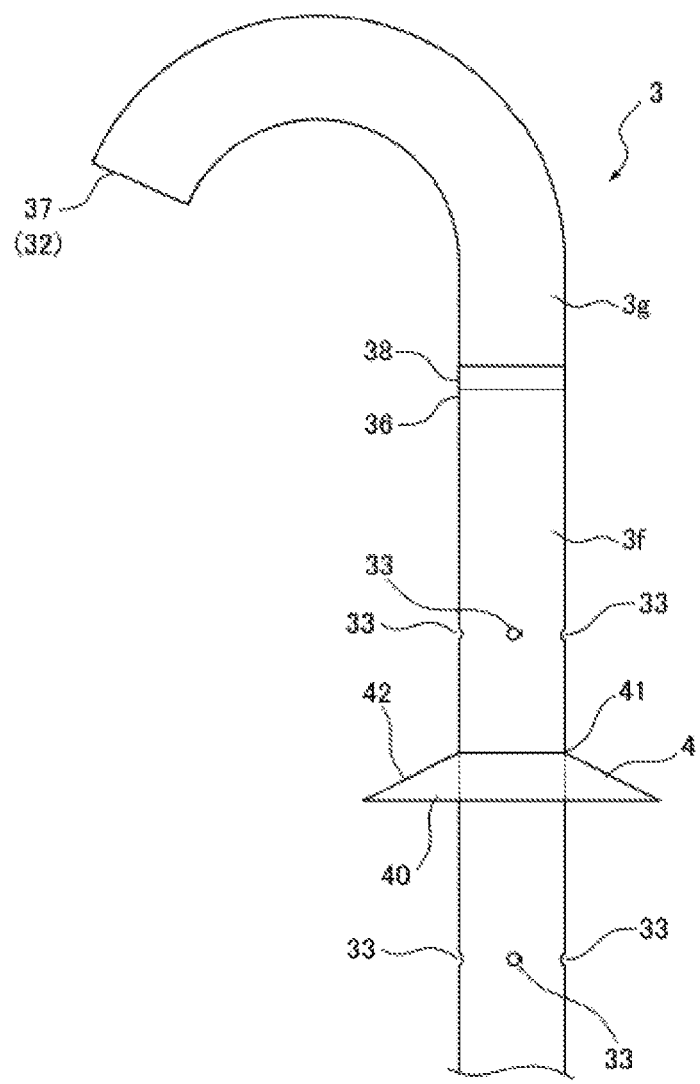
FIG. 4 is a partially enlarged side view of a blower pipe according to a second modification.

FIG. 4 is a partially enlarged side view of a blower pipe 3 according to a second modification. The blower pipe 3 has the features described with reference to FIG. 2, which are different from those described in the first embodiment.

In the present modification, the openings 33 are located nearer the distal end 36 of the straight pipe 3f (nearer the distal end 32 of the blower pipe 3) and the basal end of the straight pipe 3f (nearer the basal end 31 of the blower pipe 3) than the guard 4. More specifically, the openings 33 are located above and below the guard 4. In the present modification, the openings 33 are spaced from one another in the direction in which the straight pipe 3f extends.

Figure 5:
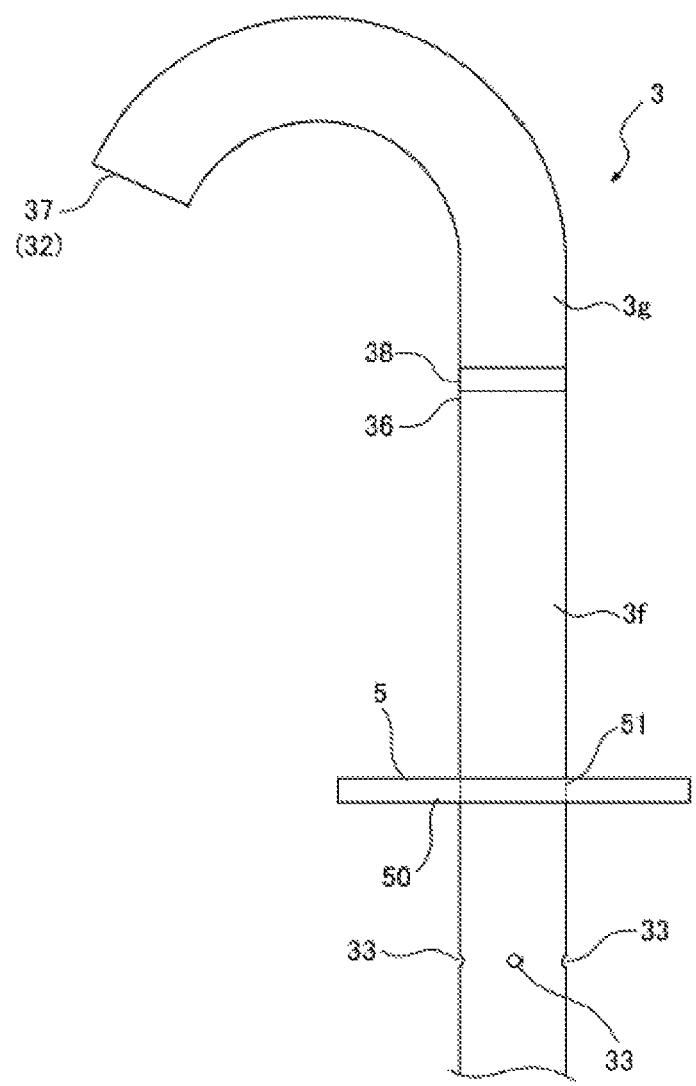
FIG. 5 is a partially enlarged side view of a blower pipe according to a third modification.

FIG. 5 is a partially enlarged side view of a blower pipe 3 according to a third modification. The blower pipe 3 will be described focusing on its differences from the first embodiment described with reference to FIG. 2.

In the present modification, a guard 5 is attached to an outer circumferential surface of the straight pipe 3f, instead of the guard 4. The guard 5 includes a rectangular plate body 50. The body 50 has a central through-hole 51, which can receive the straight pipe 3f. The guard 5 protrudes radially outward from the outer circumferential surface of the straight pipe 3f. The guard 5 according to the present modification may replace the guard 4 in the first and second modifications (refer to FIGS. 3 and 4).

Figure 6:
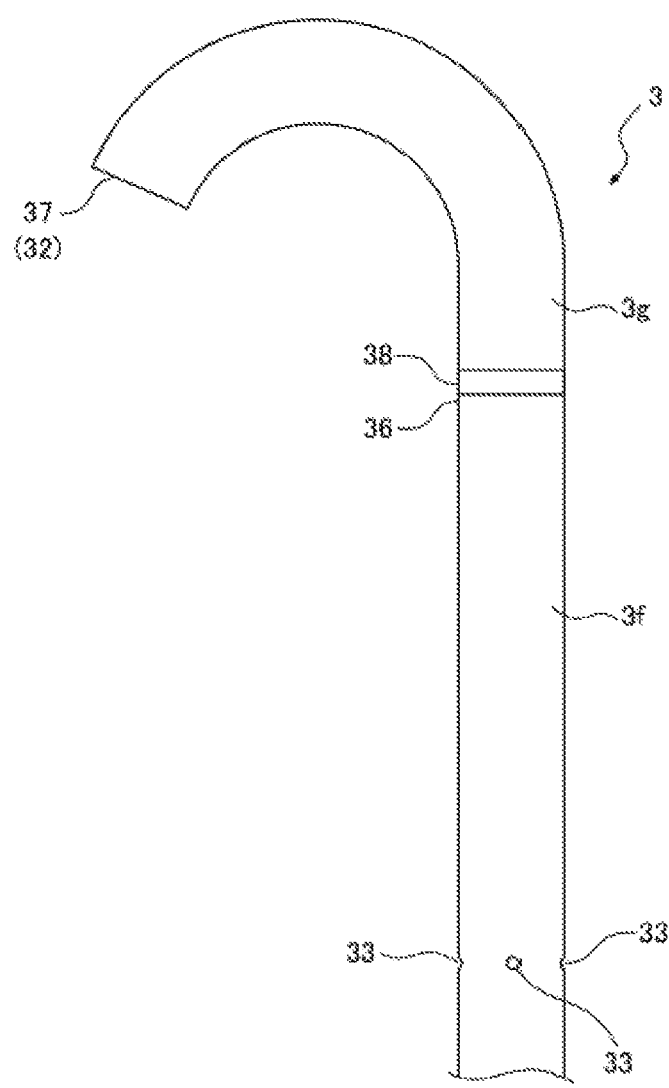
FIG. 6 is a partially enlarged side view of a blower pipe according to a fourth modification.

FIG. 6 is a partially enlarged side view of a blower pipe 3 according to a fourth modification. The blower pipe 3 will be described focusing on differences from the first embodiment described with reference to FIG. 2.

The guard 4 is eliminated in the present modification. The guard 4 may be eliminated in the first and second modifications (refer to FIGS. 3 and 4).

The blower 1 according to each of the first embodiment and the first to fourth modifications includes the blower body 2 and the blower pipe 3. The blower body 2 includes an impeller, which is driven to rotate by a prime mover, and the casing 20, which accommodates the impeller and has an air inlet and the air outlet 21. The blower pipe 3 includes the basal end 31, which is coupled to the air outlet 21, and the distal end 32, which jets air ejected through the air outlet 21, and a peripheral wall having the openings 33 (refer to FIGS. 1 to 6). Thus, some air flowing through the blower pipe 3 is jetted out of the blower pipe 3 through the openings 33. During cleaning of the rain gutter G with the blower 1, debris such as leaves or dust falling from the rain gutter G can thus be directed away from the blower pipe 3 by air jetted through the openings 33. This reduces the debris such as leaves or dust falling from the rain gutter G onto the operator M.

In the first embodiment and the first to fourth modifications, the openings 33 are spaced from one another in the circumferential direction of the blower pipe 3 (refer to FIGS. 1 to 6). Thus, a portion of air flowing through the blower pipe 3 can be radially ejected out of the blower pipe 3 through the openings 33.

In the second modification, the openings 33 are spaced from one another in the direction in which the blower pipe 3 extends (refer to FIG. 4). Thus, during cleaning of the rain gutter G with the blower 1, debris such as leaves or dust falling from the rain gutter G can be directed away from the blower pipe 3 repeatedly directed away.

The blower 1 according to each of the first embodiment and the first to third modifications includes the guard 4 or 5, which protrudes from the outer circumferential surface of the blower pipe 3 (refer to FIGS. 1 to 5). This structure can reduce debris such as leaves or dust falling from the rain gutter G onto the operator M during cleaning of the rain gutter G with the blower 1.

In the first embodiment and the first to third modifications, the openings 33 are located nearer at least one of the distal end 32 and the basal end 31 of the blower pipe 3 than the guard 4 or 5 (refer to FIGS. 1 to 5). In the blower pipe 3 having the openings 33 located nearer the distal end 32 than the guard 4 or 5 (refer to FIGS. 3 and 4), debris such as leaves or dust falling from the rain gutter G are directed away from the blower pipe 3 by air jetted through the openings 33 before reaching the guard 4 or 5 during cleaning of the rain gutter G with the blower 1. The guard 4 or 5 may thus have a small size. In the blower pipe 3 having the openings 33 located nearer the basal end 31 than the guard 4 or 5 (refer to FIGS. 1, 2, 4, and 5), debris such as leaves or dust falling from the rain gutter G and directed away from the blower pipe 3 by the guard 4 or 5 are directed away farther from the blower pipe 3 by air jetted through the openings 33 during cleaning of the rain gutter G with the blower 1.

This structure can reduce debris such as leaves or dust falling onto the operator M.

In the first embodiment and the first to third modifications, the blower pipe 3 includes the straight pipes 3b to 3f, and the guard 4 or 5 protrudes from the outer circumferential surface of the straight pipe 3f (refer to FIGS. 1 to 5). This structure reduces debris such as leaves or dust falling from the rain gutter G onto the operator M during cleaning of the rain gutter G with the blower 1.

In the first embodiment and the first to fourth modifications, the blower pipe 3 includes the straight pipes 3b to 3f, and the straight pipe 3f has the openings 33 in the peripheral wall (refer to FIGS. 1 to 6). This structure allows some air flowing through the straight pipe 3f to be jetted out of the straight pipe 3f through the openings 33. Thus, debris such as leaves or dust falling from the rain gutter G can be directed away from the straight pipe 3f by air jetted through the openings 33 during cleaning of the rain gutter G with the blower 1. This structure reduces debris such as leaves or dust falling from the rain gutter G onto the operator M.

In the first embodiment and the first to fourth modifications, the straight pipes 3b to 3f each have a distal end as an upper end, and a basal end as a lower end, and are placed vertically (refer to FIG. 1). In other words, the straight pipes 3b to 3f extend vertically. The blower 1 including the blower pipe 3 including these straight pipes 3b to 3f and the curved pipe 3g can greatly reduce work at high place to clean the rain gutter G such as an eaves gutter.

In the first embodiment and the first to fourth modifications, the curved pipe 3g and the straight pipe 3f are separate, but may be integral.

The curved pipe 3g according to each of the first embodiment and the first to fourth modifications is curved, but may be bent.

In the first embodiment and the first to fourth modifications, the openings 33 are located in the straight pipe 3f. In addition to or instead of these, such openings 33 may be located in at least one of the straight pipes 3d and 3e and the curved pipe 3g located above the operator M. The openings 33 are specifically located in the peripheral wall of the blower pipe 3 located above the operator M.

In the first embodiment and the first to third modifications, the guard 4 or 5 is attached to the outer circumferential surface of the straight pipe 3f. In addition to or instead of this, the guard 4 or 5 may be attached to at least one of the outer circumferential surfaces of the straight pipes 3d and 3e and the curved pipe 3g located above the operator M. The guard 4 or 5 is specifically attached to the outer circumferential surface of the blower pipe 3 located above the operator M.

Figure 7:
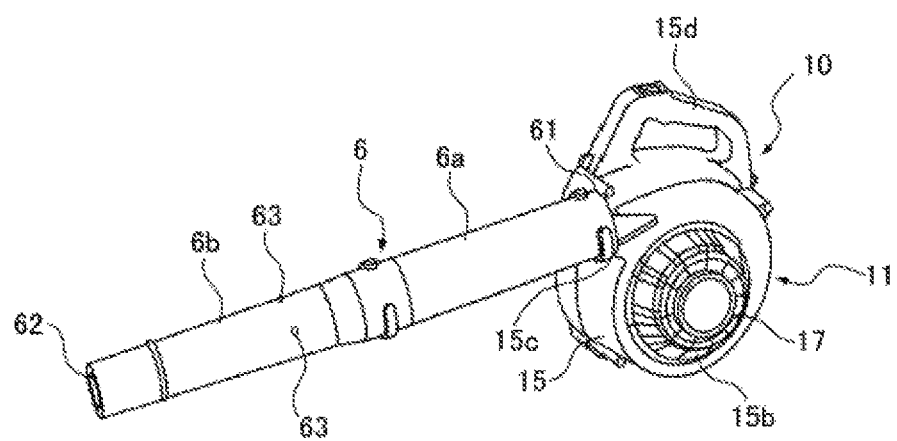
FIG. 7 is a perspective view of a blower according to a second embodiment.
Figure 8:
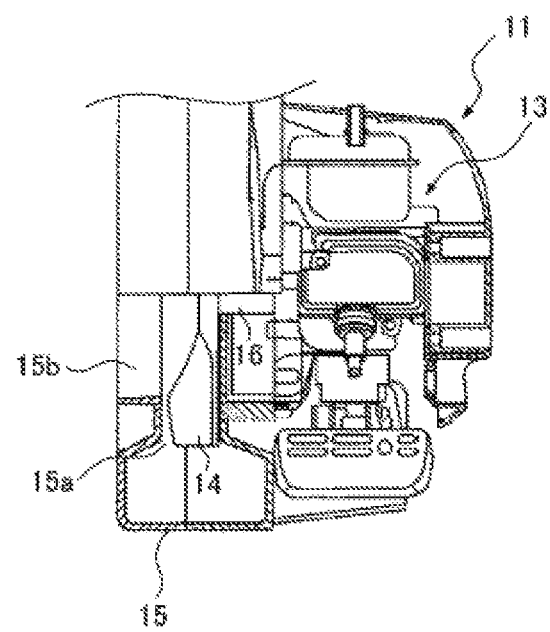
FIG. 8 is a partial cross-sectional view of a blower body according to the second embodiment.

FIG. 7 is a perspective view of a blower 10 according to a second embodiment. FIG. 8 is a partial cross-sectional view of a blower body 11 according to the present embodiment. FIG. 8 does not show an inlet port cover 17. The blower 10 will be described focusing on its differences from the first embodiment.

The blower 10 according to the present embodiment is a hand-held blower. The blower 10 includes a blower body 11 and a blower pipe 6. The blower body 11 includes a prime mover 13, an impeller 14, and a casing 15. The impeller 14 is attached to an output shaft 16 of the prime mover 13, and driven to rotate by the prime mover 13. The prime mover 13 is an engine (internal-combustion engine) in the present embodiment, but is not limited to the engine.

The casing 15 is a volute casing. The casing 15 has its side surface fixed to a side surface of the prime mover 13. The casing 15 includes an accommodating chamber 15a, an air inlet 15b, an air outlet 15c, and a handle 15d to be held by the operator M. The accommodating chamber 15a is a space for accommodating the impeller 14, and located substantially at the center of the casing 15. More specifically, the casing 15 accommodates the impeller 14. The blower body 11 takes in air through the air inlet 15b as the impeller 14 rotates and ejects the air through the air outlet 15c. The air inlet 15b is covered with the inlet port cover 17. The inlet port cover 17 has multiple air vents, and is removably attached to the casing 15.

The blower pipe 6 is formed from, for example, a resin. The blower pipe 6 has, for example, a circular or oval cross section, but may have a cross section with another shape. The blower pipe 6 is removably attached to the air outlet 15c. The blower pipe 6 has a distal end 62, which is a first open end, and a basal end 61, which is a second open end. The basal end 61 is coupled to the air outlet 15c. Air ejected through the air outlet 15c flows into the blower pipe 6 from the basal end 61, flows through the blower pipe 6, and is jetted from the distal end 62.

The blower pipe 6 includes a straight pipe 6a and a straight pipe (end nozzle) 6b. The straight pipe 6a is coupled to the air outlet 15c. The straight pipe 6b is coupled to the distal end of the straight pipe 6a. The blower pipe 6 according to the present embodiment includes two straight pipes 6a and 6b, but may include any number of straight pipes.

The straight pipes 6a and 6b each have a straight axis. The open end of the straight pipe 6a coupled to the air outlet 15c corresponds to the basal end 61. In the present embodiment, the distal end of the straight pipe 6b corresponds to the distal end 62 of the blower pipe 6. The straight pipe 6b may be flexible and deformable. The distal end of the straight pipe 6b may be tapered.

A plurality of (four in the present embodiment) openings 63 are located in the peripheral wall of the straight pipe 6b according to the present embodiment. More specifically, the straight pipe 6b of the blower 10 has the openings 63. The openings 63 allow passage into and out of the blower pipe 6. The blower pipe 6 according to the present embodiment has four openings 63 in the peripheral wall of the blower pipe 6, but may have any number of openings 63.

In the present embodiment, the openings 63 are circumferentially spaced from one another in the straight pipe 6b. The openings 63 may be circumferentially spaced at regular intervals in the straight pipe 6b. In the present embodiment, the openings 63 are at intervals of 90 degrees about the axis of the straight pipe 6b.

Each opening 63 has an opening area S4, which is smaller than an opening area S5 of the distal end 62 of the blower pipe 6. The opening area S4 may constitute 1.5 to 10% of the opening area S5, or may specifically constitute 6 to 9% of the opening area S5.

A total opening area S6 of all the openings 63 may constitute 6 to 45% of the opening area S5, or may specifically constitute 20 to 35% of the opening area S5.

In the present embodiment, some air flowing through the straight pipe 6b radially jets out of the straight pipe 6b through the openings 63. The air is jetted through the openings 63 in the direction substantially perpendicular to the direction of air flowing through the straight pipe 6b.

In the present embodiment, the guard 4 may be attached to the outer circumferential surface of the straight pipe 6a or 6b. The guard 4 thus protrudes radially outward from the outer circumferential surface of the blower pipe 6. In this example, the openings 63 are located nearer at least one of the distal end 62 and the basal end 61 of the blower pipe 6 than the guard 4. Similarly, in the present embodiment, the guard 5 may be attached to the outer circumferential surface of the straight pipe 6a or 6b.

In the present embodiment, the openings 63 are located in the straight pipe 6b. In addition to or instead of these, such openings 63 may be located in the straight pipe 6a.

In the present embodiment, the openings 63 may be spaced from one another in the direction in which the blower pipe 6 extends.

The blower pipe 3 according to the first embodiment may be removably attached to the air outlet 15c according to the present embodiment. Conversely, the blower pipe 6 according to the present embodiment may be removably attached to the air outlet 21 according to the first embodiment. More specifically, the prime mover according to the present embodiment may be an electric motor, or the prime mover according to the first embodiment may be an engine.

The blower pipe 3 with a height of about three meters attached to the air outlet 15c according to the present embodiment has openings 33 in the peripheral wall, and thus can restrict an excessive increase in the rotational speed of the engine during engine operation.

The blowers 1 and 10 according to the first and second embodiments are hand-held blowers, but are not limited to this. A blower according to the present invention may be a back-pack blower. More specifically, a blower according to the present invention may be a portable blower such as a hand-held blower or a backpack blower.

The above embodiments are mere examples of the present invention. Besides the embodiments described herein, the present invention may encompass various modifications and alterations made by those skilled in the art without departing from the scope of the invention defined by the claims.

REFERENCE SIGNS LIST 1, 10 blower
2, 11 blower body
3, 6 blower pipe
3a elbow
3b to 3f, 6a, 6b straight pipe
3g curved pipe
4, 5 guard
13 prime mover
14 impeller
15, 20 casing
15a accommodating chamber
15b air inlet
15c, 21 air outlet
15d, 22 handle
16 output shaft
17 inlet port cover
31, 61 basal end
32, 36, 62 distal end
33, 63 opening
37 first end
38 second end
40, 50 body
41, 51 through-hole
42 slope
G rain gutter
M operator

What is claimed is:

1. A blower, comprising:
    a blower body including
        an impeller drivable to rotate by a prime mover, and
        a casing accommodating the impeller, and including an air inlet and an air outlet;
    a blower pipe including
        a basal end coupled to the air outlet,
        a distal end from which air ejected through the air outlet is jetted, and
        a peripheral wall having plurality of openings circumferentially spaced from one another; and
    a guard protruding from an outer circumferential surface of the blower pipe;
    wherein some air flowing through the blower pipe is radially jetted out of the blower pipe through the plurality of openings.

2. The blower according to claim 1, wherein
the blower body takes in air through the air inlet as the impeller rotates and ejects the air through the air outlet.

3. The blower according to claim 2, wherein
the plurality of openings in the peripheral wall are spaced from one another in a direction in which the blower pipe extends.

4. The blower according to claim 1, wherein
the blower pipe includes a straight pipe, and
the guard protrudes from an outer circumferential surface of the straight pipe.

5. The blower according to claim 4, wherein
the straight pipe is placeable vertically.

6. The blower according to claim 4, wherein
the blower pipe includes a curved pipe coupled to the distal end.

7. The blower according to claim 1, wherein
the plurality of openings are located nearer the distal end than the guard.

8. The blower according to claim 7, wherein
the blower pipe includes a straight pipe, and
the guard protrudes from an outer circumferential surface of the straight pipe.

9. The blower according to claim 1, wherein
the guard is attached to the outer circumferential surface of the blower pipe.

10. The blower according to claim 9, wherein
the guard has
    a through-hole configured to receive the blower pipe, and
    a slope flared toward the basal end from the blower pipe.

11. The blower according to claim 1, wherein
the plurality of openings each have an area that is 1.5 to 10% of the area of the distal end of the blower pipe.

12. The blower according to claim 11, wherein
a total area of the plurality of openings is 6 to 45% of the area of the distal end of the blower pipe.

13. The blower according to claim 1, wherein
the plurality of openings in the peripheral wall are spaced from one another in a direction in which the blower pipe extends.

14. The blower according to claim 1, wherein
the plurality of openings are located nearer the basal end than the guard.

15. The blower according to claim 1, wherein
the blower pipe includes a straight pipe, and the plurality of openings are located in a peripheral wall of the straight pipe.

16. The blower according to claim 1, wherein the prime mover is an electric motor.

17. The blower according to claim 1, wherein the air is jetted out of the blower pipe through the plurality of openings in a direction substantially perpendicular to a direction of air flowing through the blower pipe.

18. The blower according to claim 1, wherein the guard has
   a through-hole configured to receive the blower pipe, and
   a slope flared toward the basal end from the blower pipe.

19. The blower according to claim 1, wherein the blower pipe extends substantially vertically in use such that the air is ejected downward from the distal end, and the plurality of the openings are located below the distal end and above the blower body.

* * * * *